United States Patent
Pickett et al.

(10) Patent No.: US 7,231,295 B2
(45) Date of Patent: Jun. 12, 2007

(54) SYSTEM AND METHOD FOR CREATING ACCURATE TOPOGRAPHICAL MAPS USING LOW-DRIFT DGPS

(75) Inventors: Terence D. Pickett, Waukee, IA (US); Frederick W. Nelson, Waukee, IA (US); Larry L. Hendrickson, Johnston, IA (US)

(73) Assignee: Deere & Company, Moline, IL (US)

( * ) Notice: Subject to any disclaimer, the term of this patent is extended or adjusted under 35 U.S.C. 154(b) by 592 days.

(21) Appl. No.: 10/819,743

(22) Filed: Apr. 7, 2004

(65) Prior Publication Data
US 2005/0228585 A1    Oct. 13, 2005

(51) Int. Cl.
*G21C 21/32* (2006.01)
*G08G 1/133* (2006.01)
*G01S 5/14* (2006.01)

(52) U.S. Cl. ............... 701/208; 213/209; 342/357.06; 342/357.08; 340/992

(58) Field of Classification Search ............... 701/200, 701/208–209, 213–216; 340/988, 992; 342/357.06, 342/357.08; 404/83, 84.05, 84.1, 84.2, 84.8

See application file for complete search history.

(56) References Cited

U.S. PATENT DOCUMENTS

| | | | | |
|---|---|---|---|---|
| 5,396,254 | A | * | 3/1995 | Toshiyuki ............... 342/357.13 |
| 5,633,946 | A | | 5/1997 | Lachinski et al. .......... 382/103 |
| 5,735,352 | A | * | 4/1998 | Henderson et al. .......... 172/4.5 |
| 5,838,277 | A | * | 11/1998 | Loomis et al. ......... 342/357.13 |
| 6,975,939 | B2 | * | 12/2005 | Edwards et al. ............ 701/209 |
| 2003/0112171 | A1 | * | 6/2003 | Michaelson et al. .......... 342/41 |

\* cited by examiner

*Primary Examiner*—Y. Beaulieu
(74) *Attorney, Agent, or Firm*—Suiter Swantz pc llo

(57) ABSTRACT

The present invention is directed to a method for acquiring elevation data for an area. The method includes using a GPS receiver to map ground elevations while driving back and forth over an area and periodically recording position, elevation, and time. Then, at least one track is made across the parallel tracks so that the cross track intersects the parallel tracks. The data obtained is processed and elevation data from the cross track is used to adjust elevation data for the parallel tracks, compensating for elevation drift in measurements recorded by the GPS receiver. The adjusted data for the entire area is processed using the method of the present invention to obtain an elevation map for the area.

20 Claims, 5 Drawing Sheets

SYSTEM AND METHOD FOR CREATING ACCURATE TOPOGRAPHICAL MAPS USING LOW-DRIFT DGPS

FIELD OF THE INVENTION

The present invention generally relates to the field of topographical mapping, and particularly to a system and method for creating accurate topographical maps using low-drift differentially corrected global positioning systems (DGPS).

BACKGROUND OF THE INVENTION

Mapping ground elevations for a series of locations in an area, such as for creating a topographical map of the area, may be accomplished by traversing the area and periodically measuring positional and elevation data for various locations in the area. Measuring the position and elevation of each location is typically accomplished using a global positioning system (GPS) receiver, such as a wide area differentially corrected global positioning system (WADGPS) receiver, or the like. When creating a topographical map of an area for slope sensitive applications, such as for analyzing water flow, drainage for agricultural fields, and the like, relative elevation accuracy is required. For example, topographical maps for analyzing water flow and/or drainage for agricultural fields may require relative accuracies in the 1 to 2 centimeter range. It should be noted that absolute vertical accuracy is not required for such applications, as long as the elevation measurements are taken relative to a consistent baseline.

Real-Time Kinematic (RTK) systems may be used to provide elevation measurements for producing survey quality topographical maps. These maps aid in the analysis of water flow and drainage for agricultural fields, as well as for other slope sensitive applications outside agriculture. These applications typically require elevation measurements having accuracies in the 1 to 2 centimeter range relative to a consistent baseline. Because of atmospheric interference with satellite signals received by a GPS receiver, such as interference from the ionosphere, troposphere, cloud cover, weather, and the like, elevation data measured by a GPS receiver may tend to drift over time. RTK systems continuously compare data received from a GPS system to positional and elevation measurements for a surveyed location, such as a surveyed base station. The data comparison is used to generate correction factors for adjusting measurements taken by GPS receivers in the vicinity of the surveyed base station, since the satellite signals received by the GPS receivers will be subject to atmospheric interference similar to that detected by the RTK system at the base station.

RTK systems use radio links with the base station to send the correction factors to GPS receivers for adjusting elevation measurements taken by the receivers, subsequently allowing corrected measurements to have absolute vertical accuracies in the range of several centimeters. The absolute vertical accuracies of the corrected elevation measurements ensure relative accuracies between the measurements. The range of the equipment used to transmit and receive signals over the radio links, as well as differing atmospheric conditions in the vicinity of the base station, which may make correction factors less accurate than desired, limit the area over which an RTK system may provide the accuracy desired to within a relatively small radius of a surveyed base station. Typically, this radius is a maximum of 10 to 20 kilometers. Additional problems with RTK systems include the need for achieving line of sight between radio transmitters and receivers, as well as the presence of external interference sources which may use the same band as a radio link, interfering with the reception of signals from an RTK system.

Consequently, it would be advantageous to provide a method for acquiring elevation data for an area using a GPS receiver, such as a wide area differentially corrected GPS receiver, or the like, without requiring communication with a base station of an RTK system or the like.

SUMMARY OF THE INVENTION

Accordingly, the present invention provides a method for acquiring elevation data for an area, which may be used for creating accurate topographical maps. The method of the present invention uses a GPS, such as a wide area differentially corrected GPS with low position drift rate, or the like, to map ground elevations. The method includes navigating a plurality of substantially parallel tracks traversing an area generally along a first axis (e.g., by driving back and forth over the area) while periodically recording position, altitude (uncorrected elevation), and time using the GPS. At least one cross track is navigated traversing the area generally along a second axis intersecting the first axis so that the cross track intersects the tracks, while periodically recording position, altitude, and time using the GPS. The recorded data is processed such that elevation data from the cross track is used to adjust elevation data for the substantially parallel tracks, compensating for elevation drift in measurements recorded by the GPS. In exemplary embodiments of the present invention, the drift rate of the elevation data obtained over the substantially parallel tracks is assumed to be linear with time; however, differing variances of the elevation measurements with time may be used as well. Because the cross track lies in a substantially direct path, the cross track time between points along the substantially parallel tracks transected by the cross track is very short, and the elevation drift is assumed to be zero for the transected points. Finally, the adjusted data for the entire area is processed using the method of the present invention to obtain an elevation map for the area.

For instance, through the use of a differentially corrected global positioning system with low position drift rate, for example, on the order of three sigma, XY two centimeters over 15 minutes, a vehicle is used to make an initial transect along the boundary and/or centerline of a field while recording X, Y, and vertical position information using a DGPS receiver. After completion of this track, the vehicle then makes transects perpendicular to this initial transect at a spacing that is appropriate for the resolution desired. Then, using the original information for the edge and/or centerline transect, the subsequent perpendicular intersections with the centerline can be used to measure and adjust for the GPS drift from each of these paths. After this post-processing is completed, an accurate topographical map can be constructed from this reconstituted information. Additionally, if a single point in the field can be located with respect to an absolute position, the data for the entire field can be located with respect to that position, and the data for the entire field can be adjusted to reflect the absolute vertical position of that point.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
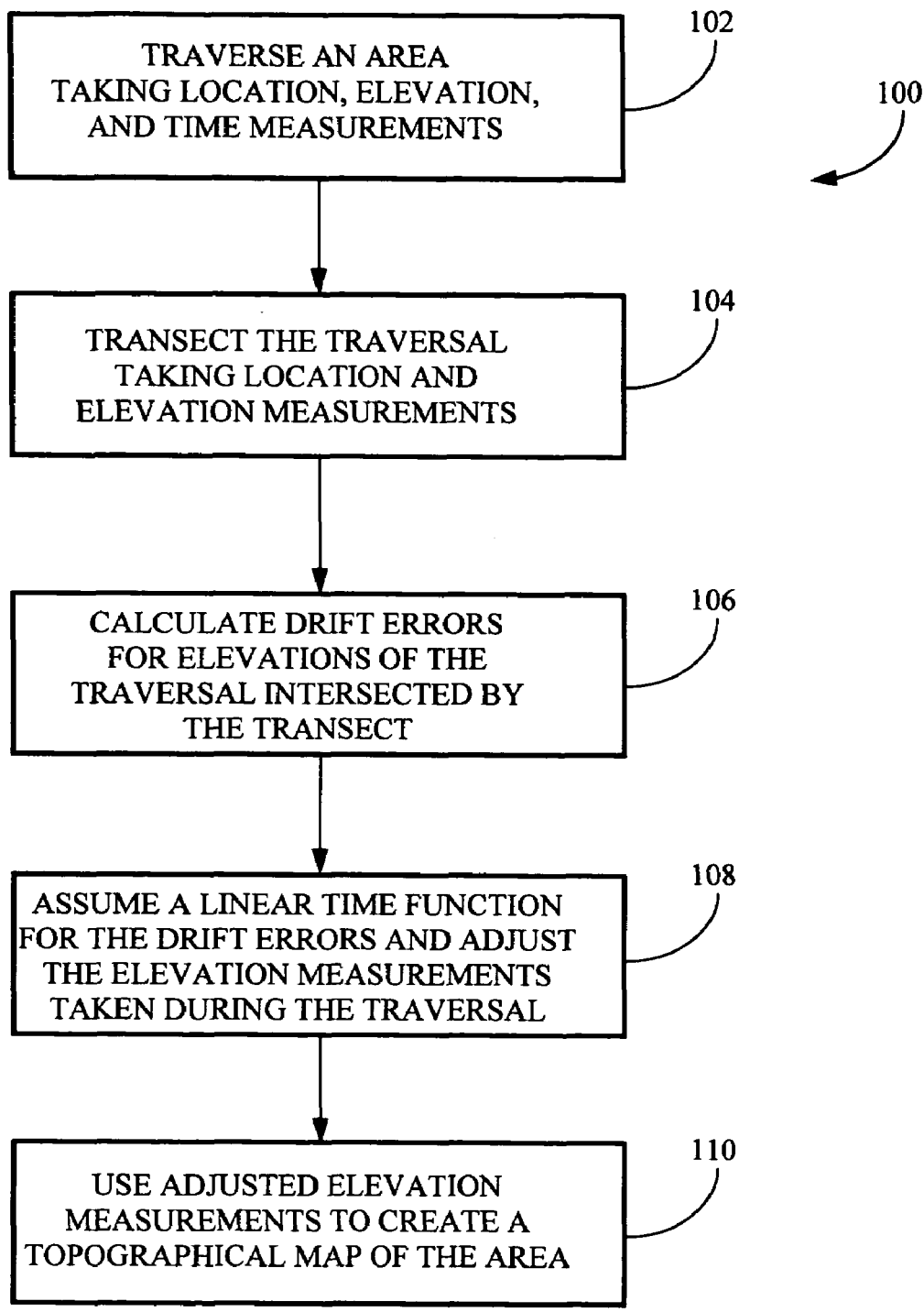
FIG. 1 is a flow diagram illustrating a method for acquiring elevation data for an area in accordance with an exemplary embodiment of the present invention.
Figure 2:
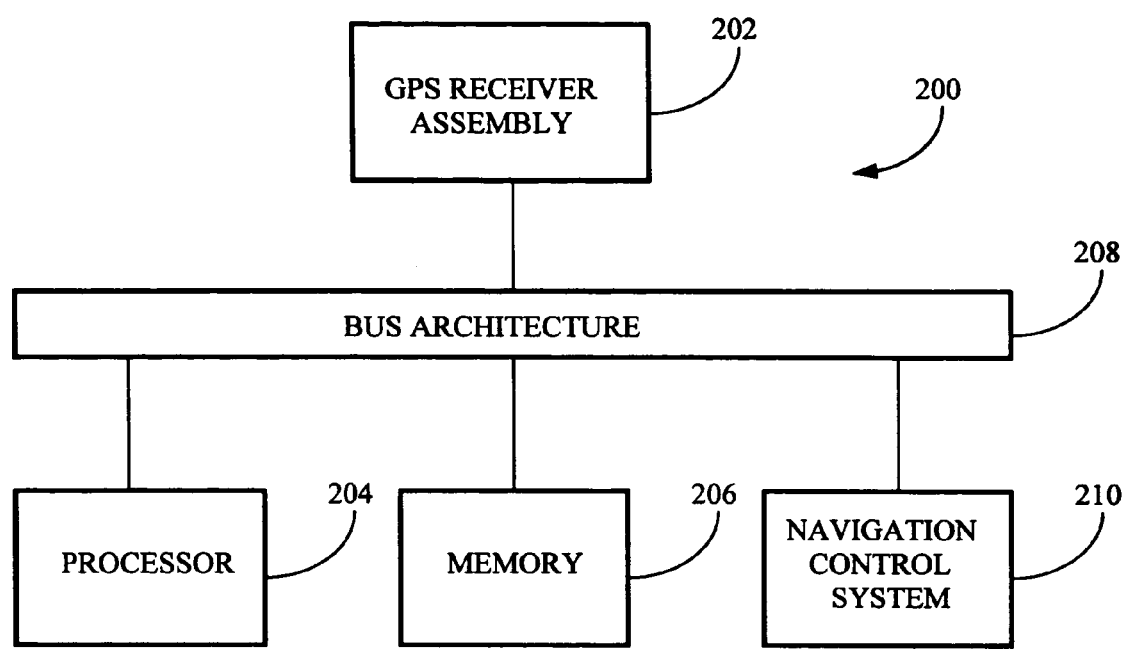
FIG. 2 is a system diagram illustrating a system for acquiring elevation data for an area in accordance with the method described in FIG. 1.
Figure 3:
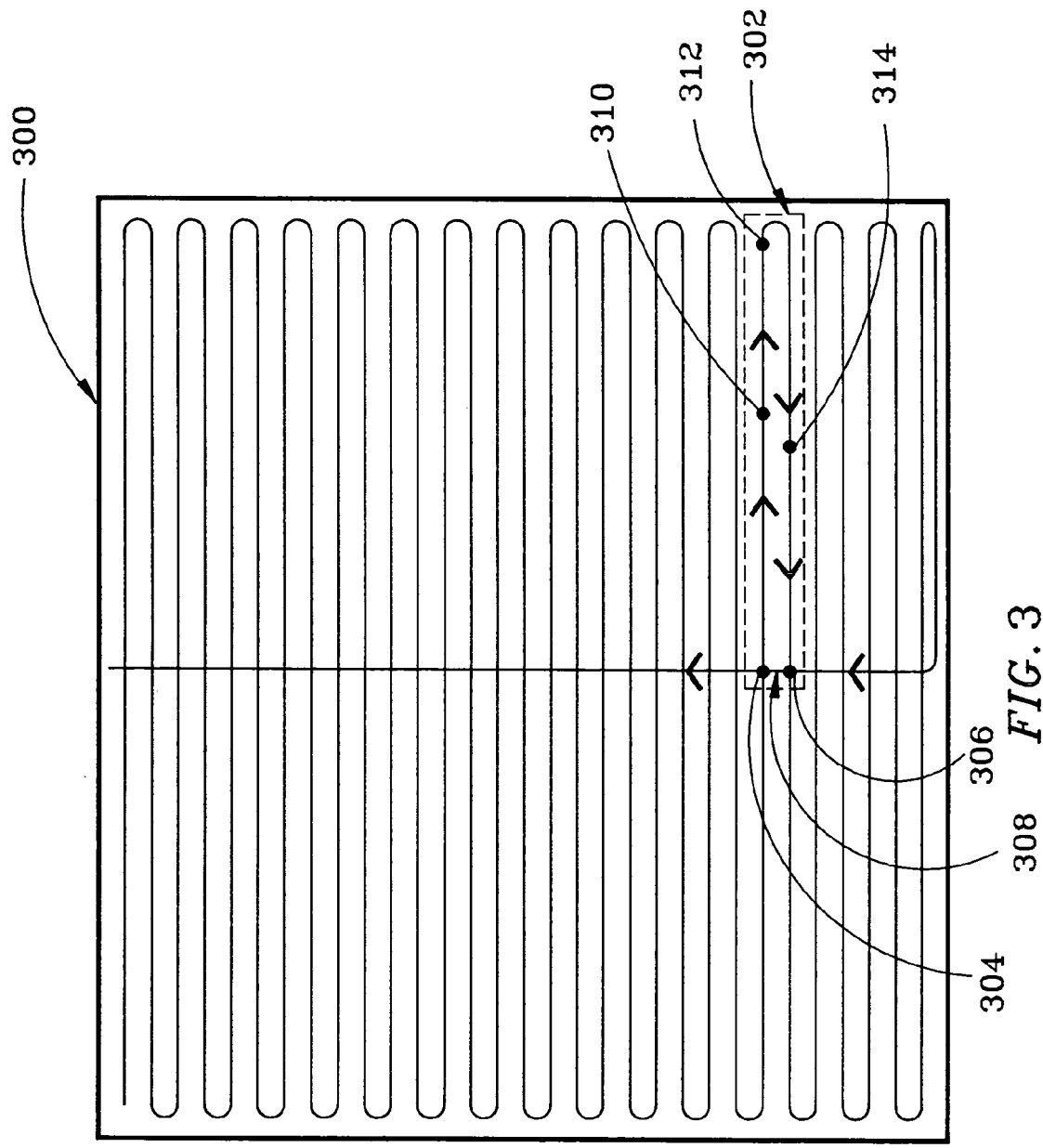
FIG. 3 is a plan view of an area for which elevation measurements have been taken in accordance with an exemplary embodiment of the present invention.

Referring generally to FIGS. 1 through 3, a method for acquiring elevation data for an area suitable for producing accurate topographical maps in accordance with an exemplary embodiment of the present invention is described. Mapping ground elevations for a series of locations in an area, such as for creating a topographical map of the area, may be accomplished by traversing the area and periodically measuring positional and elevation data for the various locations in the area. Measuring the position and elevation of each location is typically accomplished using a GPS receiver, such as a wide area differentially corrected GPS receiver, or the like. When creating a topographical map of an area for slope sensitive applications, such as for analyzing water flow, drainage for agricultural fields, and the like, relative elevation accuracy is required. For example, topographical maps for analyzing water flow and/or drainage for agricultural fields may require relative accuracies in the 1 to 2 centimeter range. It should be noted that absolute vertical accuracy is not required for such applications, as long as the elevation measurements are taken relative to a consistent baseline.

Figure 4:
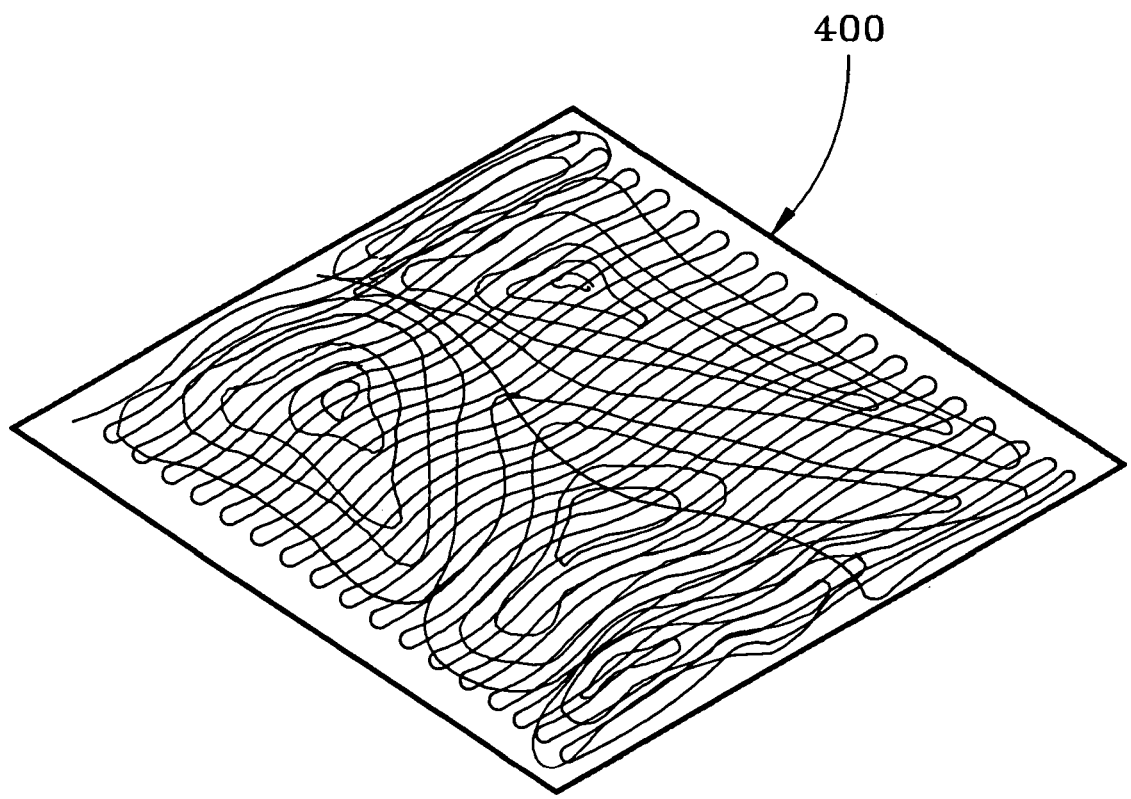
FIG. 4 is an isometric view illustrating a topographical map created using an exemplary method in accordance with the present invention.

As illustrated by FIGS. 1, 3 and 4, the method 100 includes navigating a plurality of substantially parallel tracks, including at least a first track and a second track generally parallel to the first track, traversing an area generally along a first axis, at step 102, while periodically recording position, altitude (uncorrected elevation), and time from the GPS receiver. In exemplary embodiments, step 102 may be accomplished by driving a vehicle equipped with a GPS receiver, such as a tractor equipped with a low-drift wide area differentially corrected GPS receiver, or the like, along back-and-forth tracks 302 across the area 300, repeatedly traversing the area 300, while periodically taking position, altitude (uncorrected elevation), and time measurements. Because of atmospheric interference with satellite signals received by the GPS receiver, such as interference from the ionosphere, troposphere, cloud cover, weather, and the like, elevation data received by the GPS receiver may tend to drift over time. For illustration, in the example shown in FIG. 3, elevation measurements taken by the GPS receiver during navigation of the back-and-forth tracks 302 traversing the area 300 drift one half of one centimeter from location 304 to location 306. For the purposes of this invention, it is assumed that this drift is linear with time. However, those of ordinary skill in the art will appreciate that the drift may be approximated in a different manner, such as by using curve fitting to a polynomial or logarithmic relation, or the like, without departing from the scope and intent of the present invention.

In order to increase the relative accuracy of the elevation measurements taken while traversing a portion of the area 300, the tracks 302 are transected, in step 104, by navigating at least one cross track traversing the area 300 generally along a second axis intersecting the first axis, so that the cross track intersects the tracks navigated in step 102. Position, altitude (uncorrected elevation), and time are again measured using the GPS while navigating the cross track, at step 104. In exemplary embodiments, the cross track may be navigated by driving the GPS equipped vehicle in a line substantially perpendicular to the back-and-forth tracks 302. While driving the GPS vehicle and transecting the back-and-forth tracks 302, new elevation measurements are taken at locations 304 and 306 along a third transect track or cross-track 308. Because the path of the cross-track 308 between locations 304 and 306 is in a substantially direct line, considerably less time is required to travel the distance between locations 304 and 306. Thus, the new elevation measurements taken at locations 304 and 306 may be considered free of drift for the purposes of this invention. The new elevation measurements taken along cross-track 308 are then used in place of the initial elevation measurements taken at locations 304 and 306 during traversal 302.

The recorded data is processed, at steps 106 and 108, such that elevation data from the cross track is used to adjust elevation data for the substantially parallel tracks, compensating for elevation drift in measurements recorded by the GPS. For example, by comparing the new elevation measurements taken at locations 304 and 306 to the initial elevation measurements taken at the same locations, a linear time function is used to adjust elevation measurements taken during the traversal 302, such as elevation measurements taken at locations 310, 312, 314 and the like. In accordance with exemplary embodiments of the present invention, the times at which the initial elevation measurements are taken for locations 304 and 306 are recorded. Also, the times at which elevation measurements are taken for locations 310, 312, and 314 are recorded. These recorded times are then used for adjusting elevation measurements 310, 312, and 314, for achieving a greater relative accuracy between the elevation measurements. Finally, the adjusted data for the entire area may be processed using the method of the present invention to obtain an elevation map 400 for the area 300, at step 110.

A specific example is now provided for illustration wherein elevation measurements are taken and then adjusted, using method 100, for creating a topographical map 400 of an area 300 in accordance with an exemplary embodiment of the present invention. In step 102, the area 300 is traversed, and a first elevation measurement of 386 meters 10.5 centimeters is taken for location 304 at time 405 seconds. Traversal 302 is made of a portion of the area 300, and second elevation measurements of 387 meters 58.2 centimeters for location 310, 386 meters 34.5 centimeters for location 312, and 386 meters 85.7 centimeters for location 314 are taken at times 556 seconds, 680 seconds, and 912 seconds respectively. A third elevation measurement of 386 meters 24.2 centimeters is taken for location 306 at time 1080 seconds. After remaining traversals of the area 300 are completed, in step 104 a transect is made substantially perpendicular to the traversals made in step 102, such as transect 308 across traversal 302. A fourth elevation measurement of 386 meters 10.8 centimeters is made for location 304 and a fifth elevation measurement of 386 meters 24.0 centimeters is made for location 306.

In step 106 of method 100, a drift error is calculated for traversal 302. The drift error is equal to subtracting the elevation difference of the first and third measurements taken during traversal 302 from the elevation difference of the fourth and fifth measurements taken during transect 308. For instance, in the present example, the drift error is calculated by subtracting the first elevation measurement of 386 meters 10.5 centimeters for location 304 and the fifth elevation measurement of 386 meters 24.0 centimeters for location 306 from a sum of the third elevation measurement of 386 meters 24.2 centimeters for location 306 and the fourth elevation measurement of 386 meters 10.8 centimeters for location 304: 386 m 24.2 cm+386 m 10.8 cm−386 m 10.5 cm−386 m 24.0 cm=0.5 cm. Thus, the drift error between the elevation difference of the initial first and third measurements (386 m 10.5 cm−386 m 24.2cm=−13.7 cm) taken during traversal 302 and the elevation difference of the fourth and fifth measurements (386 m 10.8 cm−386 m 24.0 cm=−13.2 cm) taken during transect 308 is one half of one centimeter (−13.2 cm−−13.7 cm=0.5 cm) in the present instance. Those of ordinary skill in the art will appreciate that the drift error may be calculated in various ways, the order of addition and subtraction of elevation measurements being alterable while still attaining consistent results. It should be noted, however, that preserving the sign of an operation's numerical result is important when dealing with drift error calculations, in order to prevent a negative change in elevation from becoming a positive change, a positive change in elevation from becoming a negative change, or the like.

Next, in step 108 of method 100, the drift error is used to adjust elevation measurements taken at locations 310, 312, and 314 during traversal 302, for achieving a greater relative accuracy between the elevation measurements. In an exemplary embodiment of the present invention, the elevation measurements are adjusted by subtracting the first elevation measurement of 386 meters 10.5 centimeters for location 304 and a fraction of the drift error of 0.5 cm from a sum of the second elevation measurement (in this example, one of the elevation measurements taken at locations 310, 312, and 314) and the fourth elevation measurement of 386 meters 10.8 centimeters for location 304. The fraction of the drift error is proportional to a difference between the time at which the first elevation measurement was made for location 304 (the first time) and the time at which the second elevation measurement was made (for one of the elevation measurements taken at locations 310, 312, and 314) versus a difference between the first time and the time at which the third elevation measurement was made for location 306. Those of ordinary skill in the art will appreciate that elevation measurements 310, 312, and 314 may be adjusted in a variety of different ways, including the use of the third elevation measurement of 386 meters 24.2 centimeters for location 306 in combination with the fifth elevation measurement of 386 meters 24.0 centimeters for location 306, or the like, without departing from the scope and spirit of the present invention.

For example, the second elevation measurement of 387 meters 58.2 centimeters for location 310 taken at time 556 seconds is adjusted in the following manner: first, the difference between the time at which the first elevation measurement was made for location 304 (405 seconds) and the time at which the second elevation measurement was made for location 310 (556 seconds) is calculated, and the result is found to be 151 seconds (556 seconds−405 seconds=151 seconds). Next, the difference between the first time (405 seconds) and the time at which the third elevation measurement was made for location 306 (1080 seconds) is calculated, and the result is found to be 675 seconds (1080 seconds−405 seconds=675 seconds). Thus, the fraction of the drift error of 0.5 cm used to adjust the elevation measurement for location 310 will be 0.5 cm times 151 divided by 675. Then, the sum of the second elevation measurement of 387 meters 58.2 centimeters for location 310 and the fourth elevation measurement of 386 meters 10.8 centimeters for location 304 is found to be 773 meters 69.0 centimeters (387 m 58.2 cm+386 m 10.8 cm=773 m 69.0 cm). And finally, the first elevation measurement of 386 meters 10.5 centimeters for location 304 and the fraction of the drift error of 0.5 cm times 151 divided by 675 are subtracted from the sum of the second elevation measurement of 387 meters 58.2 centimeters for location 310 and the fourth elevation measurement of 386 meters 10.8 centimeters for location 304, and the result is found to be 387 meters 58.4 centimeters (773 m 69.0 cm−386 m 10.5 cm−0.5 cm×151/675=387 m 58.4 cm). This new elevation is now associated with the elevation of location 310, being a more accurate elevation measurement relative to other adjusted elevations for traversal 302.

In a further example, the second elevation measurement of 386 meters 34.5 centimeters for location 312 taken at time 680 seconds is adjusted in the following manner: first, the difference between the time at which the first elevation measurement was made for location 304 (405 seconds) and the time at which the second elevation measurement was made for location 312 (680 seconds) is calculated, and the result is found to be 275 seconds (680 seconds−405 seconds=275 seconds). Next, the difference between the first time (405 seconds) and the time at which the third elevation measurement was made for location 306 (1080 seconds) is calculated, and the result is found to be 675 seconds (1080 seconds−405 seconds=675 seconds). Thus, the fraction of the drift error of 0.5 cm used to adjust the elevation measurement for location 312 will be 0.5 cm times 275 divided by 675. Then, the sum of the second elevation measurement of 386 meters 34.5 centimeters for location 312 and the fourth elevation measurement of 386 meters 10.8 centimeters for location 304 is found to be 772 meters 45.3 centimeters (386 m 34.5 cm+386 m 10.8 cm=772 m 45.3 cm). And finally, the first elevation measurement of 386 meters 10.5 centimeters for location 304 and the fraction of the drift error of 0.5 cm times 275 divided by 675 are subtracted from the sum of the second elevation measurement of 386 meters 34.5 centimeters for location 312 and the fourth elevation measurement of 386 meters 10.8 centimeters for location 304, and the result is found to be 386 meters 34.6 centimeters (772 m 45.3 cm−386 m 10.5 cm−0.5 cm×275/675=386 m 34.6 cm). This new elevation is now associated with the elevation of location 312, being a more accurate elevation measurement relative to other adjusted elevations for traversal 302.

In another example, the second elevation measurement of 386 meters 85.7 centimeters for location 314 taken at time 912 seconds is adjusted in the following manner: first, the difference between the time at which the first elevation measurement was made for location 304 (405 seconds) and the time at which the second elevation measurement was made for location 314 (912 seconds) is calculated, and the result is found to be 507 seconds (912 seconds–405 seconds=507 seconds). Next, the difference between the first time (405 seconds) and the time at which the third elevation measurement was made for location 306 (1080 seconds) is calculated, and the result is found to be 675 seconds (1080 seconds–405 seconds=675 seconds). Thus, the fraction of the drift error of 0.5 cm used to adjust the elevation measurement for location 314 will be 0.5 cm times 507 divided by 675. Then, the sum of the second elevation measurement of 386 meters 85.7 centimeters for location 314 and the fourth elevation measurement of 386 meters 10.8 centimeters for location 304 is found to be 772 meters 96.5 centimeters (386 m 85.7 cm+386 m 10.8 cm=772 m 96.5 cm). And finally, the first elevation measurement of 386 meters 10.5 centimeters for location 304 and the fraction of the drift error of 0.5 cm times 507 divided by 675 are subtracted from the sum of the second elevation measurement of 386 meters 85.7 centimeters for location 314 and the fourth elevation measurement of 386 meters 10.8 centimeters for location 304, and the result is found to be 386 meters 85.6 centimeters (772 m 96.5 cm–386 m 10.5 cm–0.5 cm×507/675=386 m 85.6 cm). This new elevation is now associated with the elevation of location 314, being a more accurate elevation measurement relative to other adjusted elevations for traversal 302.

In another aspect of the present invention, if an elevation measurement is taken for a location in the area 300 with respect to a position for which an absolute elevation measurement is known, all other elevation measurements for the area 300 are adjusted to reflect the absolute vertical position of that point. For instance, an elevation measurement for location 312 is taken with respect to a position for which an absolute elevation measurement is known. The more accurate elevation measurement for location 312 is found to be 386 meters 34.4 centimeters, and the second elevation measurement (adjusted for greater relative accuracy in accordance with an exemplary embodiment of the present invention) of 386 meters 34.5 centimeters for location 312 is adjusted to 386 meters 34.4 centimeters to reflect the more accurate vertical position. Accordingly, all other elevation measurements for the area 300 are then adjusted to reflect the absolute vertical position of 386 meters 34.4 centimeters for location 312.

In the present example, adjusting the other elevation measurements for the area 300 is accomplished by subtracting 0.1 cm (386 m 34.4 cm–386 m 34.5 cm=–0.1 cm) from each measurement to reflect the difference between the elevation measurement for location 312 taken during traversal 302 (adjusted for greater relative accuracy) and the vertical position for location 312 taken with respect to the position for which the absolute elevation measurement is known. For example, the fourth elevation measurement of 386 meters 10.8 centimeters for location 304 is adjusted to 386 meters 10.7 centimeters by subtracting 0.1 centimeter. Likewise, the fifth elevation measurement of 386 meters 24.0 centimeters for location 306 is adjusted to 386 meters 23.9 centimeters; the second elevation measurement (adjusted) of 387 meters 58.4 centimeters for location 310 is further adjusted to 387 meters 58.3 centimeters; and finally, the second elevation measurement (adjusted) of 386 meters 85.6 centimeters for location 314 is further adjusted to 386 meters 85.5 centimeters.

Referring now to FIGS. 2, 3 and 4, a low-drift wide area DGPS receiver assembly 200 for use with an exemplary method of the present invention, such as method 100, is described. The DGPS receiver assembly includes a global positioning system receiver assembly 202 and a processor 204 coupled with a memory 206, interconnected in a bus architecture 208. The global positioning system receiver assembly 202 receives positioning signals from a global positioning system and generates global positioning system based navigation information including position (e.g., latitude and longitude), course or heading, speed, time, and the like, for use by the processor 204, the memory 206, and other components of the navigation system 200. In exemplary embodiments, the global positioning system receiver assembly 202 receives positioning signals from the Global Positioning System (GPS), a space-based radio-navigation system managed by the United States Air Force for the Government of the United States. However, it is contemplated that the global positioning system receiver assembly 202 may alternately be adapted for use with other radio based navigation/global positioning systems such as the GLONASS Navigation Satellite System managed by the Russian Space Agency (RSA) for the Russian Federation. Additionally, in embodiments of the invention, the global positioning system receiver assembly 202 may be capable of receiving and utilizing enhanced positioning information provided by differential GPS systems and wide area differential GPS (WADGPS) such as the STARFIRE™ WDGPS system developed by John Deere and Company of Moline, Ill., the Wide Area Augmentation System (WAAS) provided by the Federal Aviation Administration of the United States Government, or the like. In such embodiments, the global positioning system receiver assembly 202 may include, or be coupled to, a radio receiver for receiving differential error correction information.

In exemplary embodiments of the present invention, the global positioning system receiver assembly 202 and a navigation control system 210 are interconnected in the bus architecture 208. For example, a navigation control system uses the navigation information provided by the global positioning system receiver assembly 202 to furnish navigation or guidance information to the operator of a vehicle. Additionally, where automatic steering is employed, the navigation control system uses the information to control vehicle steering controllers which steer the vehicle along a desired path or track (e.g. tracks 302 and 308) traversing the area 300. For example, in exemplary embodiments of the invention, the navigation control system may be capable of navigating, and, optionally, steering substantially parallel paths or tracks through a field. In further exemplary embodiments of the invention, the navigation control system may furnish information and/or guidance for intersecting the back-and-forth tracks 302 of a traversal at specific points during a transect, matching the intersection points of the transect (e.g., points 304 and 306) to data points previously recorded during the traversal.

Those of ordinary skill in the art will appreciate that the data collected by the DGPS receiver assembly 200 may be stored in the memory 206 in preparation for adjustment/processing by the processor 204, dynamically adjusted/processed during operation of the DGPS receiver assembly 200, or alternately, the data stored in the memory 206 may be processed externally after being transferred from the memory 206 to an external information handling device, such as a desktop computer, a laptop computer, a mainframe computer, or the like.

Referring now to FIG. 4, the elevation measurements taken for the area 300 (FIG. 3) and subsequently adjusted in steps 102 through 110 of exemplary method 100 (FIG. 1) may be used to create a topographical map, such as topographical map 400. Alternately, the elevation measurements may be stored in an information handling device, a computer-readable memory, the memory 206 of the DGPS receiver assembly 200 (FIG. 2), or the like.

Figure 5:
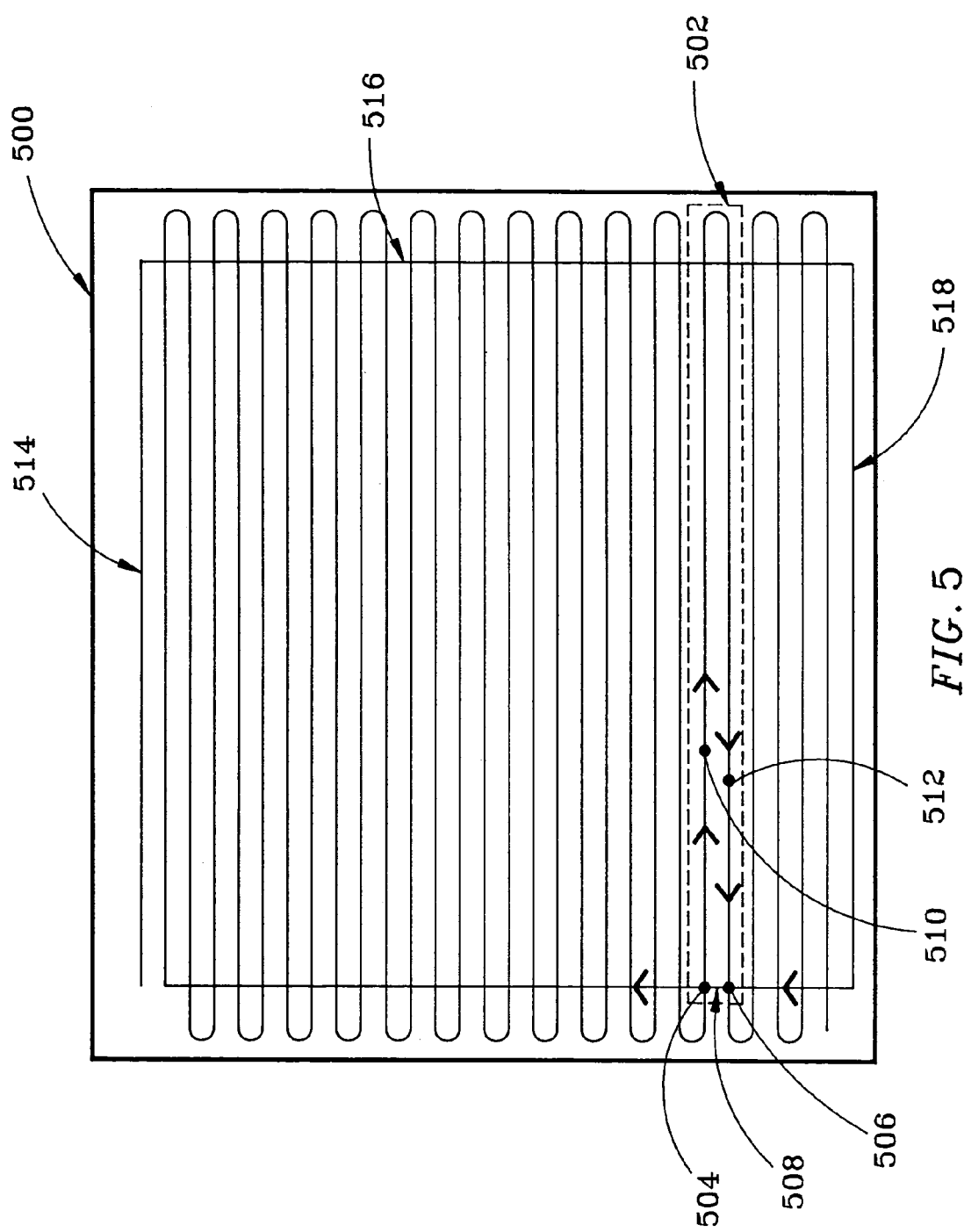
FIG. 5 is a plan view of an area for which elevation measurements have been taken in accordance with an exemplary embodiment of the present invention.

Referring to FIG. 5, a method for acquiring elevation data for an area 500 suitable for producing accurate topographical maps in accordance with a further exemplary embodiment of the present invention is described. The method includes circumnavigating the area 500, such as by navigating tracks 508, 514, 516, and 518. The circumnavigation of the area 500 includes navigating cross tracks traversing the area 500 generally along a first axis, such as cross tracks 508 and 516. While traversing the cross tracks, position, altitude, and time are periodically recorded using a GPS. Then a plurality of substantially parallel tracks traversing the area 500 generally along a second axis are navigated, such as tracks 502, while periodically recording position, altitude (uncorrected elevation), and time using the GPS. Preferably the second axis is substantially perpendicular to the first axis. The recorded data is processed such that elevation data from the cross tracks is used to adjust elevation data for the substantially parallel tracks, compensating for elevation drift in measurements recorded by the GPS. Because each cross track lies in a substantially direct path, the cross track time between points along the substantially parallel tracks transected by the cross track is very short, and the elevation drift is assumed to be zero for the transected points. For instance, the elevation drift between points 504 and 506 is assumed to be zero. Finally, the adjusted data for the entire area is processed using the method of the present invention to obtain an elevation map for the area. For example, the position and elevation data recorded for the cross tracks 508 and 516 may be used to adjust the elevation measurements for locations 510 and 512 along tracks 502.

Those of ordinary skill in the art will appreciate that the position, elevation, and time measurements taken for the cross tracks 508 and 512 may be used to calculate the relative elevations of points along the cross tracks and the substantially parallel tracks with greater accuracy. For example, an average of drift rates taken between cross tracks 508 and 516 for tracks 502 may be used for calculating the relative elevations of locations 510 and 512 with greater accuracy. It should also be noted that the direction of propagation of the substantially parallel tracks, such as tracks 502 or the like, will be in the same direction as one of the cross tracks made during the circumnavigation of the area 500, such as cross track 516, while being in an opposing direction to the other of the cross tracks, such as cross track 508. It may be desirable to use data collected during the navigation of either one or the other of the cross tracks in order to minimize the error created by the assumption that the drift error is negligible during navigation of a cross track. For example, it may be preferable to use data collected along cross track 516, navigated in the direction of propagation of the tracks 502 for adjusting the elevation measurements of points 510 and 512. Alternately, in another instance, it may be preferable to use data collected along cross track 508, navigated opposite to the direction of propagation of the tracks 502. It will be understood by those of ordinary skill in the art that either one or the other of the cross tracks, such as cross tracks 508, 516, or the like, may be used to adjust elevation measurements taken during the navigation of the substantially parallel tracks, such as tracks 502, and data adjusted using each cross track may be compared, such as averaged or the like, for greater relative accuracy of measurements, and/or for increasing the relative accuracy of measurements made along the cross tracks.

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for acquiring elevation data for an area, comprising:
    navigating a first track traversing the area generally along a first axis;
    navigating a second track traversing the area, the second track being substantially parallel with the first track;
    navigating a third track traversing the area generally along a second axis, the second axis intersecting the first axis;
    periodically acquiring position, altitude and time data along the first, second and third tracks using a global positioning system (GPS); and
    processing the acquired position, altitude and time data to obtain the elevation data for the area, wherein the position, altitude and time data for the third track are used to adjust the altitude data for the first and second tracks to account for elevation drift.

2. The method as claimed in claim 1, wherein the global positioning system (GPS) comprises a low drift wide area differentially corrected global positioning system (GPS).

3. The method as claimed in claim 1, further comprising using the elevation data to generate a topographical map of the area.

4. The method as claimed in claim 1, wherein the step of processing the acquired data further comprises:
    determining a track segment along the first and second tracks having a drift rate, the track segment intersecting the third track at a first point and a second point, the first and second points being disposed on the first and second tracks;
    calculating the elevations of the first point and the second point on the track segment using the acquired position, altitude and time data acquired for the third track; and
    adjusting the elevation data along the track segment using the calculated elevation of the first and second points.

5. The method as claimed in claim 4, further comprising navigating at least a fourth track traversing the area, the fourth track being substantially parallel with the first track.

6. The method as claimed in claim 5, wherein the step of processing the acquired data further comprises:
determining at least a second track segment along two of the first, second, and fourth tracks having a drift rate, the second track segment intersecting the third track at a third point and a fourth point, respectively, the third and fourth points being disposed on any adjacent two of the first track, second track, and fourth track;
calculating the elevations of the third point and the fourth point on the second track segment using the acquired position, altitude and time data acquired for the third track; and
adjusting the elevation data along the second track segment using the calculated elevation of the third and fourth points.

7. The method as claimed in claim 1, further comprising locating the absolute altitude of a point in the area and using the absolute altitude of the point to adjust the elevation data to provide at least approximate absolute elevations for the area.

8. The method as claimed in claim 1, wherein the area comprises a field.

9. The method as claimed in claim 1, wherein the first track is generally perpendicular to the third track.

10. A system for acquiring elevation data for an area, comprising:
a global positioning system receiver for receiving a positioning signal from a global positioning system and generating position information for points within the area, the position information for each point including at least a position, an altitude and a time; and
a processing system for processing the position information to obtain elevation data for the area,
wherein the elevation data is obtained by navigating a first track traversing the area generally along a first axis; navigating a second track traversing the area, the second track being substantially parallel with the first track; navigating a third track traversing the area generally along a second axis, the second axis intersecting the first axis; and periodically acquiring position, altitude and time data along the first, second and third tracks using the position information generated by the global positioning system receiver; the position, altitude and time data for the third track are used to adjust the altitude data for the first and second tracks to account for elevation drift.

11. The system as claimed in claim 10, wherein the global positioning system (GPS) comprises a low drift wide area differentially corrected global positioning system (GPS).

12. The system as claimed in claim 10, further comprising a memory for recording the acquired position, altitude and time data.

13. The system as claimed in claim 10, wherein the elevation data is suitable for use in generating a topographical map of the area.

14. The system as claimed in claim 10, wherein the processing system processes the acquired position, altitude, and time data to obtain the elevation data by:
determining a track segment along the first and second tracks having a drift rate, the track segment intersecting the third track at a first point and a second point, the first and second points being disposed on the first and second tracks;
calculating the elevations of the first point and the second point on the track segment using the acquired position, altitude and time data acquired for the third track; and
adjusting the elevation data along the track segment using the calculated elevation of the first and second points.

15. The system as claimed in claim 14, wherein at least a fourth track traversing the area is navigated, the fourth track being substantially parallel with the first track.

16. The method as claimed in claim 15, wherein the processing system processes the acquired position, altitude and time data by:
determining at least a second track segment along two of the first, second, and fourth tracks having a drift rate, the second track segment intersecting the third track at a third point and a fourth point, respectively, the third and fourth points being disposed on any adjacent two of the first track, second track, and fourth track;
calculating the elevations of the third point and the fourth point on the second track segment using the acquired position, altitude and time data acquired for the third track; and
adjusting the elevation data along the second track segment using the calculated elevation of the third and fourth points.

17. The system as claimed in claim 10, wherein the processing system further locates the absolute position of a point in the area and using the absolute position of the point to adjust the elevation data to provide at least the approximate absolute elevation of the area.

18. The system as claimed in claim 10, wherein the area comprises a field.

19. The system as claimed in claim 10, wherein the first track is generally perpendicular to the third track.

20. A system for obtaining elevation data for an area, comprising:
means for navigating a first track at least substantially traversing the area generally along a first axis;
means for navigating a second track at least substantially traversing the area generally along a second axis, the second axis intersecting the first axis;
means for navigating a third track at least substantially traversing the area, the third track being substantially parallel with the second track;
means for periodically recording position, altitude and time data along the first, second and third tracks using a differentially corrected GPS; and
means for processing the recorded position, altitude and time data to obtain the elevation data for the area, wherein the position, altitude and time data for the first track and the position and time data for the second and third track are used to adjust the altitude data for the second and third tracks for elevation drift.

* * * * *